(12) United States Patent
Mastic et al.

(10) Patent No.: US 11,371,873 B2
(45) Date of Patent: Jun. 28, 2022

(54) VEHICLE BASED FLUID METER TESTER

(71) Applicants: Christopher Michael Mastic, Ocala, FL (US); David Allen Zook, Ocala, FL (US); Michael Louis Mastic, Ocala, FL (US); Floyd Stanley Salser, Jr., Ocala, FL (US)

(72) Inventors: Christopher Michael Mastic, Ocala, FL (US); David Allen Zook, Ocala, FL (US); Michael Louis Mastic, Ocala, FL (US); Floyd Stanley Salser, Jr., Ocala, FL (US)

( * ) Notice: Subject to any disclaimer, the term of this patent is extended or adjusted under 35 U.S.C. 154(b) by 23 days.

(21) Appl. No.: 16/019,479

(22) Filed: Jun. 26, 2018

(65) Prior Publication Data

US 2019/0137321 A1 May 9, 2019

Related U.S. Application Data

(63) Continuation of application No. 15/646,043, filed on Jul. 10, 2017, now Pat. No. 10,317,270, which is a continuation of application No. 15/179,716, filed on Jun. 10, 2016, now Pat. No. 9,891,089, which is a continuation-in-part of application No. 29/559,780, filed on Mar. 31, 2016, now Pat. No. Des. 788,272, and a continuation-in-part of application No. 29/526,717, filed on May 13, 2015, now Pat. No. Des. 767,104, and a continuation of application No. 14/253,824, filed on Apr. 15, 2014, now Pat. No. 9,702,751, said application No. 29/526,717 is a continuation of application No. 29/480,517, filed on Jan. 27, 2014, now Pat. No. Des. 755,939.

(60) Provisional application No. 62/677,007, filed on May 27, 2018, provisional application No. 62/525,104, filed on Jun. 26, 2017, provisional application No. 62/173,861, filed on Jun. 10, 2015, provisional application No. 61/811,830, filed on Apr. 15, 2013.

(51) Int. Cl.
*G01F 25/00* (2006.01)
*B60K 15/06* (2006.01)

(52) U.S. Cl.
CPC .......... *G01F 25/0007* (2013.01); *B60K 15/06* (2013.01)

(58) Field of Classification Search
CPC ........................... G01F 25/0007; B60K 15/06
See application file for complete search history.

(56) References Cited

U.S. PATENT DOCUMENTS

2015/0226597 A1* 8/2015 Gaspard, Jr. ........ G01F 25/0007
73/1.16
2017/0010139 A1* 1/2017 Vilstrup .................. E21B 47/10

* cited by examiner

*Primary Examiner* — Daniel S Larkin
*Assistant Examiner* — Anthony W Megna Fuentes
(74) *Attorney, Agent, or Firm* — William Simmons

(57) ABSTRACT

The disclosed technology is a portable/mobile test bench apparatus and method for testing the accuracy of fluid flow meters. The system comprises an improved drain line system that better removes the test fluid after testing. The system is configured to automatically test the fluid meter at a plurality of flow rates and record the test data as well as transfer the test data to a centralized database.

20 Claims, 5 Drawing Sheets

VEHICLE BASED FLUID METER TESTER

This application claims the benefit of provisional application 62/173,861 filed on 10 Jun. 2015 and is further a continuation in part to pending design patent application Ser. No. 29/559,7809, filed on 31 Mar. 2016, and claiming priority to pending design patent application Ser. No. 29/526,717, filed on 13 May 2015 which is a continuation in part of design patent application Ser. No. 29/480,517, filed on 27 Jan. 2014, and Utility patent application Ser. No. 14/253,824, filed on 15 Apr. 2014 claiming the benefit of provisional application 61/811,830 filed on 15 Apr. 2013, of which the entire contents of all such references are incorporated herein by this reference for all that they disclose for all purposes.

TECHNICAL FIELD

The invention relates to the field of mobile fluid meter test systems where the test system is associated with a vehicle.

BACKGROUND OF THE INVENTION

There are many different types of water meters, including positive displacement, multi-jet, nutating disc, sound-based systems (e.g., ultrasonic), and the fluidic oscillator, just to name a few, all using different principles to measure fluid flow. Notably, meter accuracy will vary between meters, even meters of the same make and type. In fact, a particular meter may be inherently better at measuring higher flows compared to lower flows. Consequently, a flow meter is generally tested for accuracy over a plurality of fluid flow rates.

Although vastly different technologies can be used to measure fluid flow, the principles/processes used to test their accuracy are the same: run a known volume (i.e., the "actual volume") of water through one or more meters and compare such test meter's indicated flow volume to the actual volume. If the meter under test provides measured volume readings within an acceptable deviation from the actual volume, then the meter is working correctly.

When testing fluid meters, the fundamental task is to provide a test system that (i) generates the desired fluid flow (that flows through the meters being tested), (ii) at the desired flow rate, and (iii) determines the "actual volume" value for the fluid that flowed during a test where such value is used to compare to the measured volume values generated by the meters being tested. Such is likely a much more complicated task than one might appreciate, and the technology disclosed herein relates to such a test system.

The most widely used and probably the most popular method for testing flow meters is called the volumetric system. The volumetric system can be compared to a measuring cup—one puts a substance in the cup, which has a scale that indicates volume. For a fluid meter test system, a fluid is pumped through meters under test and into a calibrated fluid tank where volume values are marked at different levels along the side of the tank (or some similar method), and the fluid level is viewed through a sight tube. The corresponding volume in the calibrated fluid tank is then compared to the volumes recorded by the meters. Thus, if the fluid tank indicates, for example, there is 20.36 gallons of water in the tank, a meter being tested should indicate that 20.36 gallons of water have flowed through the meter.

It is very difficult, however, to achieve the level of accuracy needed (for testing purposes) to determine the "actual value" of fluid volume by reading the level of a fluid against a measuring stick (basically). Thus, very accurate systems use an additional property of the fluid to determine its volume: weight.

The gravimetric test system further measures the weight of the fluid in the calibrated fluid tank. The increase of the weight of the calibrated fluid tank holding the fluid pumped through the meters under test is proportional to the amount of fluid pumped into the tank. Before the test, the tank is empty and weights X. After the test, the tank contains the fluid pumped through the meters under test and such tank and fluid weights (X+W) where "W" is the weight of such fluid. Thus, the "actual volume" value would be determined, at least in part, using weight "W."

One of the oldest and most respected manufacturers and pioneers of prior art fluid meter test bench technologies is MARS® Company. MARS® is a domestic and international leader in water meter testing and technology services. An exemplary MARS® small meter prior art gravimetric test system will test a plurality of meters during one test (say 20, although the number can vary per customer requirements) where the input of the first meter is connected to the test system fluid source. The meters are placed in series so that the output of one meter is connected to the input of the next meter and so on down the line until the output of the last meter is associated with the measuring tank. Such a test system configuration allows a plurality of meters to be tested simultaneously, thereby saving time.

Thus, a typical prior art gravimetric test system that is configured to be housed in a test facility is made up of the following components:

Test Bench: The actual device on which meters to be tested are secured;

Carrier Bars: The device(s) on the bench that holds the meters in place (carry) allowing them to slide/move to form a fluid-tight seal (without the need for bolts) when a clamping device pushes them together;

Test Spools: Varying lengths and diameters of pipe spools used as spacers and transition pieces between meters under test;

Meter Adaptors: Meters come in various sizes and are typically threaded onto the input and output (of various sizes/diameters) so that fluid pipes can be associated with the meter. Adapters allow for the positioning of threaded meter inputs in the test system without the need for a threaded connector which provides for the quick transition from one-meter size to the next;

Motion Operator: The device on the test bench which causes the clamping force that pushes the meters and associated valves and spools together to form a water-tight transition from meter to meter without using bolts—just a clamping pressure;

Electric Actuator: The part of the motion operator that moves the device;

Measurement Tanks: Tanks into which the fluid forced through the meters under test during testing is directed for measuring volume via a measuring "stick" and/or scales;

Scales: The physical hardware on which the measurement tanks sit that measures the weight of the tank and any fluid in the tank;

Control Valves: A system of valves that direct the fluid throughout the different cycles of testing;

Control Console: The testing interface which houses the control wiring, computer, and the scale interface hardware (to communicate automatically with the scales);

Controller: The measurement system used to measure volume and serve as an operator interface for the computerized and manually controlled tests;

Software: The computer code used in conjunction with the Controller to control and document the tests as well as provide an inventory database; and Roto Meters:Quick reference flow meters allowing the technician to set an approximate flow rate (to within + or −2%) while running a test.

There are situations, however, where it is much more practical to test a flow meter in the field. For such situations, it is necessary to take the "test system" to the site where the flow meter to be tested is installed. For such systems, the "test bench" is associated with a vehicle. The inventions disclosed in this document related to such a test bench associated with a vehicle to make the test system mobile.

SUMMARY OF THE INVENTION

Some of the objects and advantages of the invention will now be set forth in the following description, while other objects and advantages of the invention may be obvious from the description or may be learned through practice of the invention.

Broadly speaking, a principle object of the present invention is to provide a portable/mobile test bench apparatus and method for testing fluid flow meters.

Another object of the present invention is to provide a portable/mobile test bench apparatus and method for testing fluid flow meters where the apparatus comprises drain lines configured to remove the test fluid after testing is complete.

Still, another objection object of the present invention is to provide a portable/mobile test bench apparatus and method for testing fluid flow meters at a plurality of flow rates and further comprising a controller configured to automatically configure the system for the different flow rates and record the test data and transfer such test data to a remote database.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, the substitution of equivalent steps, referenced or discussed, and the functional, operational, or positional reversal of various features, steps, parts, or the like. Still further, it is to be understood that different embodiments, as well as different presently current embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

DISCLOSURE OF THE INVENTION

Detailed Description

Figure 1:
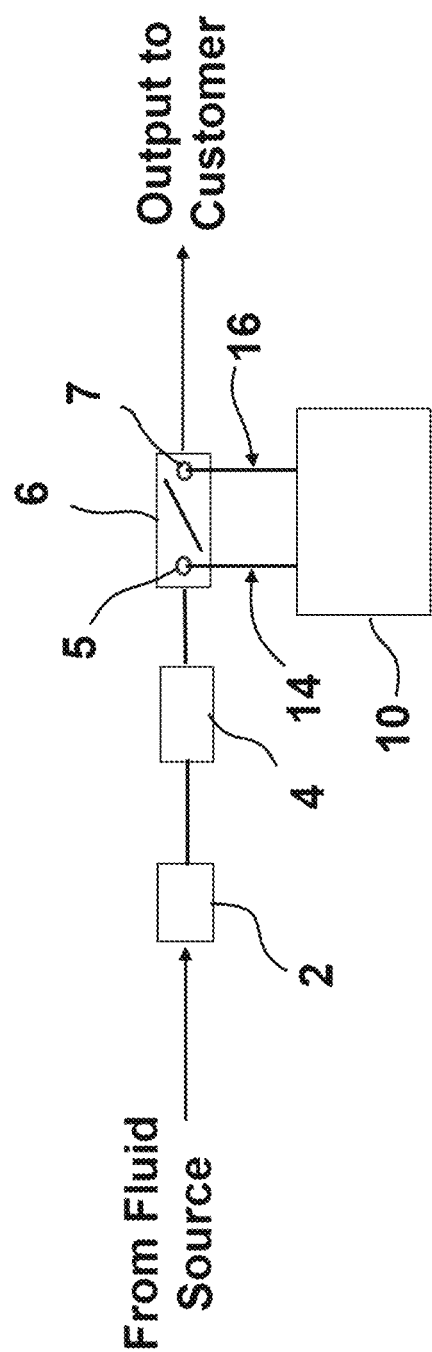
FIG. 1 is a block diagram representation of a fluid meter tester associated with a meter under test.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only and is not intended as limiting the broader aspects of the present invention.

Construction Aids

For the purposes of this document two or more items are "mechanically associated" by bringing them together or into a relationship with each other in any number of ways including a direct or indirect physical "releasable connections" (snaps, screws, Velcro®, bolts, etc.—generally connections designed to be easily and frequently released and reconnected), "hard-connections" (welds, rivets, macular bonds, generally connections that one does not anticipate disconnecting very often if at all and that are "broken" to separate), and/or "moveable connections" (rotating, pivoting, oscillating, etc.).

Similarly, two or more items are "electrically associated" by bringing them together or into a relationship with each other in any number of ways, including (a) a direct, indirect or inductive communication connection and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

As used herein, unless stated otherwise, the terms "first," "second," and "third" may be used interchangeably to distinguish one component from another and are not intended to signify the location or importance of the individual components.

As used herein, the terms "upstream" and "downstream" refer to the relative location of components in a fluid pathway. For example, component A is upstream of component B if a fluid flows from component A to component B. Conversely, component B is downstream of component A if component B receives a fluid flow from component A.

As used herein, the term "axial" refers to a direction of flow through an object; the term "radial" refers to a direction extending away from the center of an object or normal to the "axial" direction, and the term "circumferential" refers to a direction extending around the circumference or perimeter of an object.

For the purposes of this document, unless otherwise stated, the phrase "at least one of A, B, and C" means there is at least one of A, or at least one of B, or at least one of C or any combination thereof (not one of A, and one of B, and one of C).

This document includes headers that are used for place markers only. Such headers are not meant to affect the construction of this document, do not in any way related to the meaning of this document, nor should such headers be used for such purposes.

Description

While the particulars of the present invention and associated technology may be adapted for use with any type of vehicle, the examples discussed herein are primarily in the context of systems configured to fit in the bed of a truck.

Referring now to FIG. 1, it should be appreciated that the mobile fluid meter tester (10) is configured to test flow meters (4) that are typically installed at a customer site and metering fluid. Thus, a fluid source is connected to the input service valve (2) and then to a meter (4) (e.g., MUT) input. The meter (2) output is connected to an output service valve (6), which defines or is associated with a service valve input port (5) and a service valve output port (7). When the output service valve (6) is turned off, fluid flow through the valve is prevented.

Figure 2:
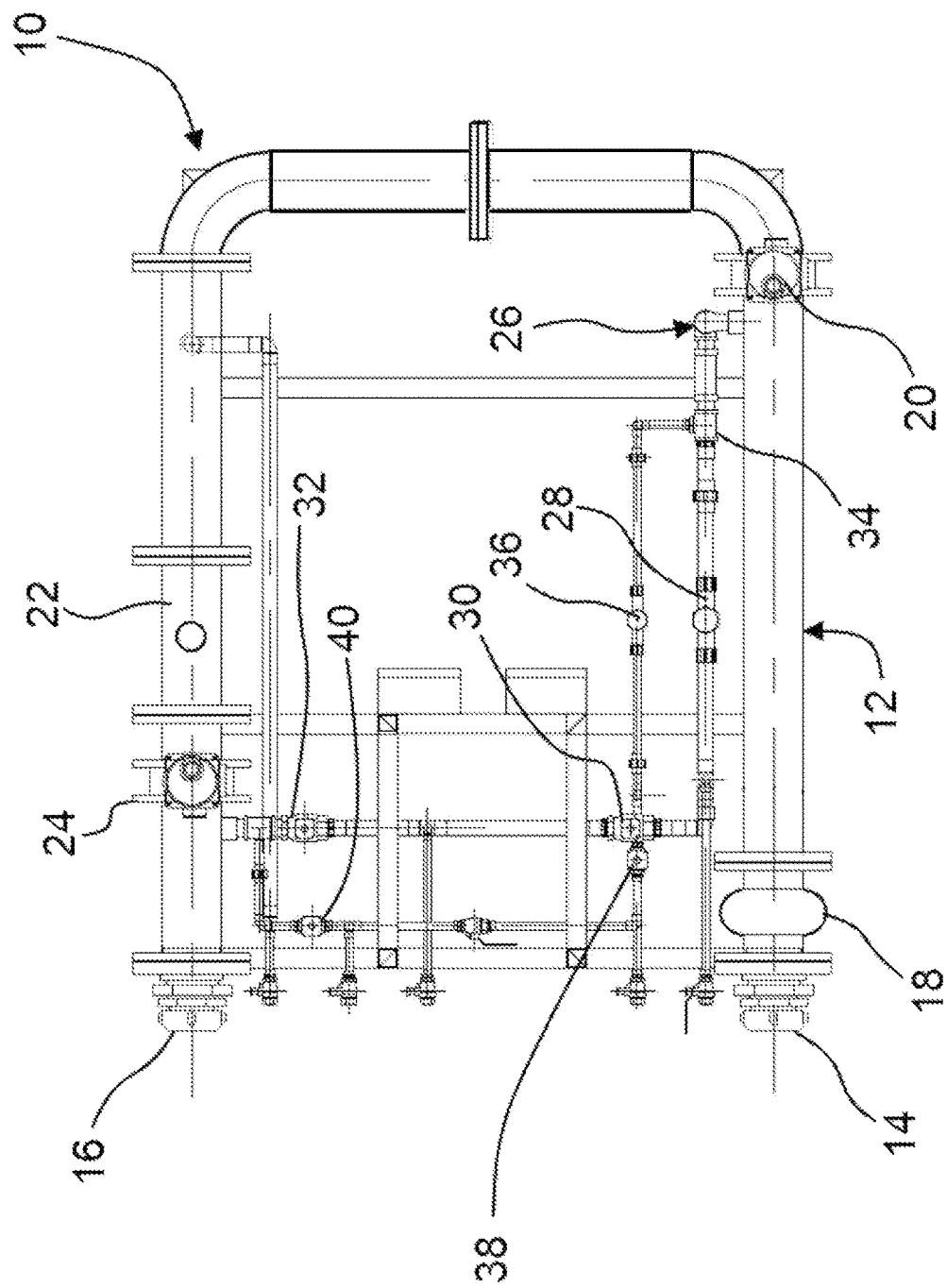
FIG. 2 is a top plan view of a mobile fluid meter tester.

Referring now to FIG. 2, a top plan view of the mobile fluid meter tester (10) is presented. The mobile fluid meter tester (10) comprises a primary flow path (12) comprising the tester input (14) and tester output (16). The tester input (14) is configured for being mechanically associated with and placed in fluid communication with the output of a flow meter (4) via service valve input port (5). The tester output (16) is further configured for being mechanically associated with and placed in fluid communication with the output service valve (6). When the output service valve (6) is turned off, fluid cannot flow through the output service valve (6), thereby internally separating the input port (5) from the output port (7). Thus, the fluid flow path during a typical test is as follows: fluid flows from the fluid source, through the input valve (2), through the MUT (4) and out the service valve input port (5) through the tester input (14), out the tester output (16) and to the customer service line via service valve output port (7).

Near the tester input (14), a strainer element (18) is provided to remove debris from the fluid used during testing. The primary flow path (12) passes through a first primary flow valve (20), through a high flow metering device (22) through a second primary flow valve (24) and to the tester output (16) of the mobile fluid meter tester (10).

As noted above, the output of the MUT is connected to the tester input (14). The tester output (16) is preferably connected back to the service pipe so that the test fluid is not wasted and reintroduced into the service pipe. If sanitation is an issue, the tester output could be directed to a location other than the service pipe.

A second flow path (26) provides an alternative flow path from the primary flow path at a point before the first primary flow valve (20) and through a medium flow metering device (28), a first medium flow valve (30), a second medium flow valve (32) and back to the primary flow path (12) between the second primary flow valve (24) and the tester output (16).

A third flow path (34) provides yet another alternative fluid flow path from the second flow path (26) at a point before the medium flow metering device (28), to low flow metering device (36), to a first low flow valve element (38), to a second low flow valve element (40) and back into the second flow path (26) between the second medium flow control valve (32) and primary flow path (12).

From the above, one exemplary embodiment of a mobile fluid meter test system MFMTS (10) is presented. MFMTS (10) comprises a primary flow channel (12) comprising a plurality of primary flow sections wherein one section comprises a primary flow meter (22). The primary flow channel further defines a system input (14) at one end and a system output (16) at a second end where the system input (14) is in fluid communication with the output of a flow meter under test (4) associated with a test fluid source and wherein the system output (16) is in fluid communication with a test fluid receiver (such as a customer service line). A test fluid flows from said test fluid source, through the flow meter under test (4), through the primary flow meter (22) and to the test fluid receiver. Notably, the mobile fluid meter test system is configured for being associated with a vehicle such as a truck. Thus, for the embodiment in FIG. 2, the system defines a "U" shape.

There is at least one drain line comprising a drain valve in fluid communication with at least one of the plurality of primary flow sections. The drain line is configured to drain the test fluid from said mobile fluid meter test system. Notably, the primary flow section associated with the at least one drain line is lower than the remainder of the primary flow sections.

For a second embodiment, the MFMTS (10) comprises a secondary flow path. For such embodiment, a primary valve (20) is disposed along the primary flow channel (12) and upstream from the primary meter (22). A second flow channel (26) is associated with the primary flow channel (12) upstream from the primary valve (20). The second flow channel comprises a secondary flow meter (28) and defines a secondary input in fluid communication with the primary flow channel (26) upstream from the primary valve (20) and a secondary output in fluid communication with the primary flow channel and downstream from the primary flow meter (22) so that a test fluid flows from the test fluid source, through the flow meter under test (4), through the secondary flow meter (28) and to the test fluid receiver when said primary valve (22) is closed. Notably, if there is a tertiary flow path with a tertiary valve, such a tertiary valve is also closed during testing via the secondary flow path.

As before, at least one drain line comprising a drain valve is in fluid communication with the second flow channel.

For yet another embodiment, a third flow channel is provided. For this embodiment, a secondary valve (30) is disposed along said second flow channel and downstream from said secondary meter. A third flow channel (34) is provided, comprising a tertiary flow meter (36). The tertiary flow channel defines a tertiary input in fluid communication with the secondary flow channel (26) upstream from said secondary valve and a tertiary output in fluid communication with the secondary flow channel and downstream from the secondary valve so that a test fluid flows from a test fluid source, through the flow meter under test (4), through the tertiary flow meter (36) and to the test fluid receiver when the primary valve (20) and secondary flow valve (38) are closed. A tertiary valve is disposed along the third flow channel. As before, at least one drain line comprising a drain valve is in fluid communication with the third flow channel.

Preferably, the primary meter (22) is more accurate at higher flow rates compared to the secondary meter (28), which is more accurate at higher flow rates than said tertiary meter (36).

For one embodiment, the primary valve the secondary valve and the tertiary valve are electronic valves electrically associated with a controller. As disclosed below, the controller is configured to automatically open and close at least one of the primary valve, the secondary valve, and the tertiary valve as required for a predefined test. The controller (8) is preferably configured to execute software to automatically perform a primary flow channel test, a second flow channel test and a third flow channel test to generate test data for the flow meter under test (4) and to transfer the test data to a remote database as described below.

Draining

Figure 3:
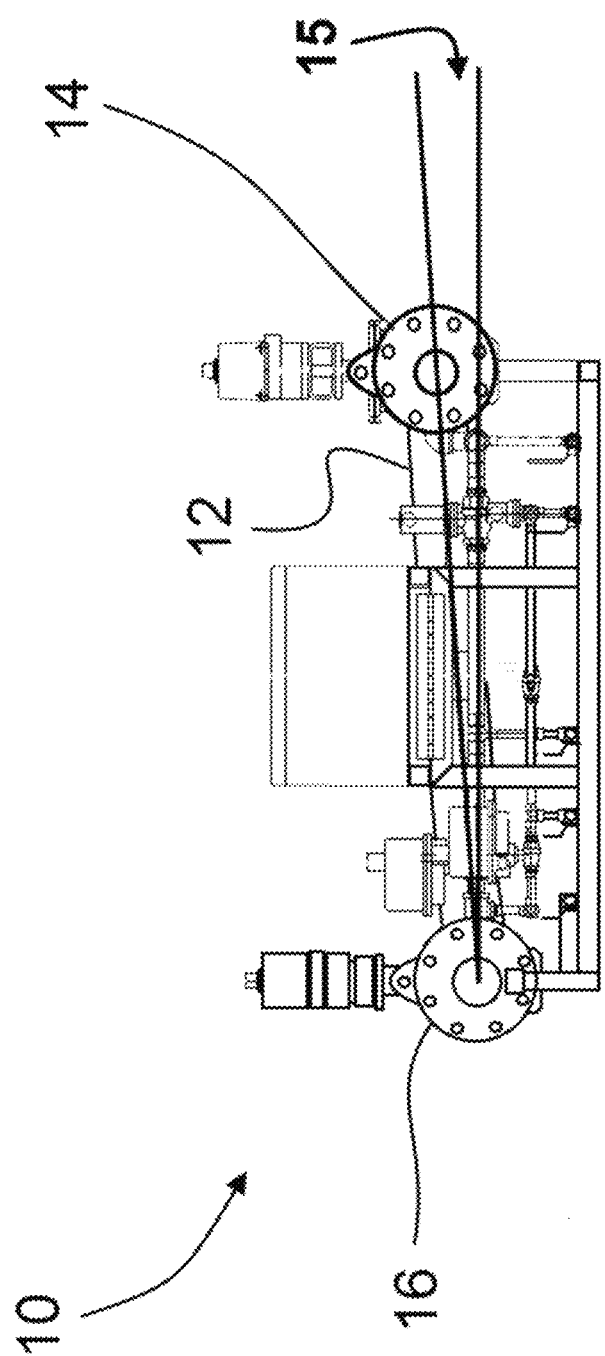
FIG. 3 is a front elevational view of a mobile fluid meter tester.
Figure 4:
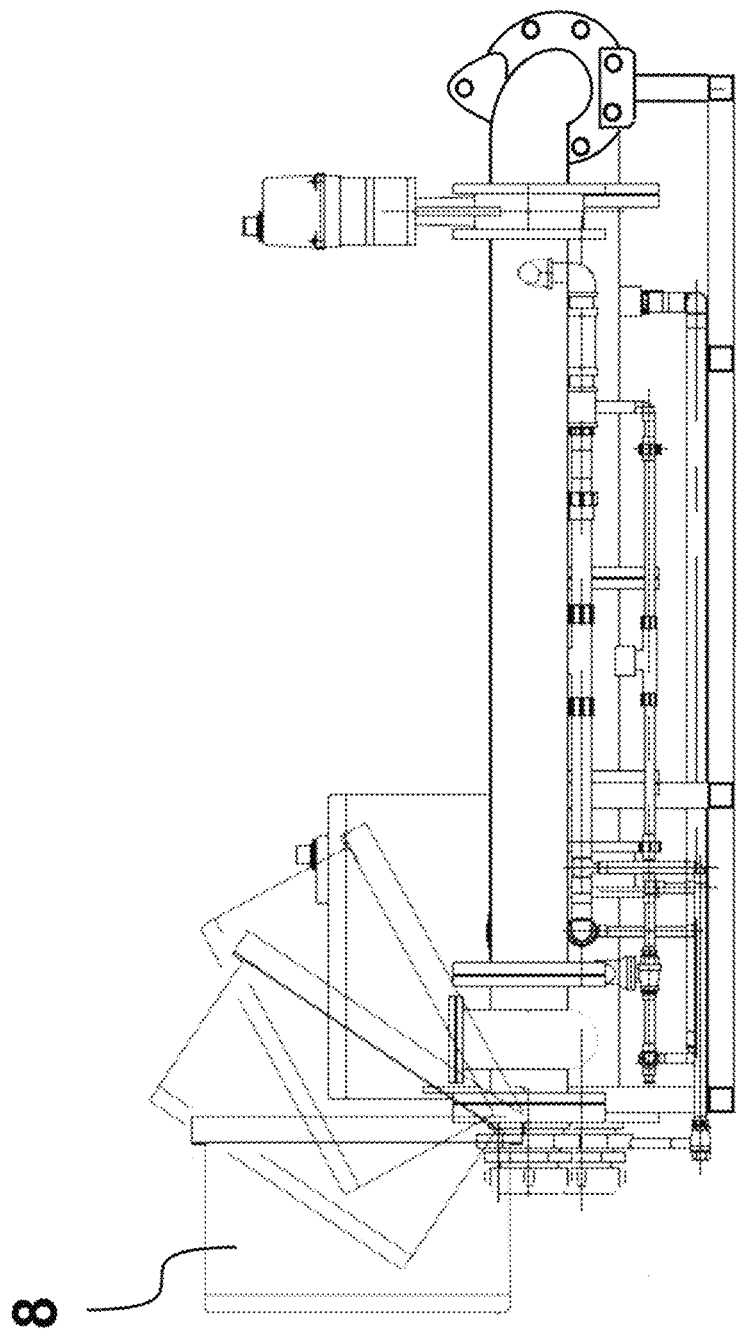
FIG. 4 is a side elevational view of a mobile fluid meter tester showing a rotatable controller housing.
Figure 5:
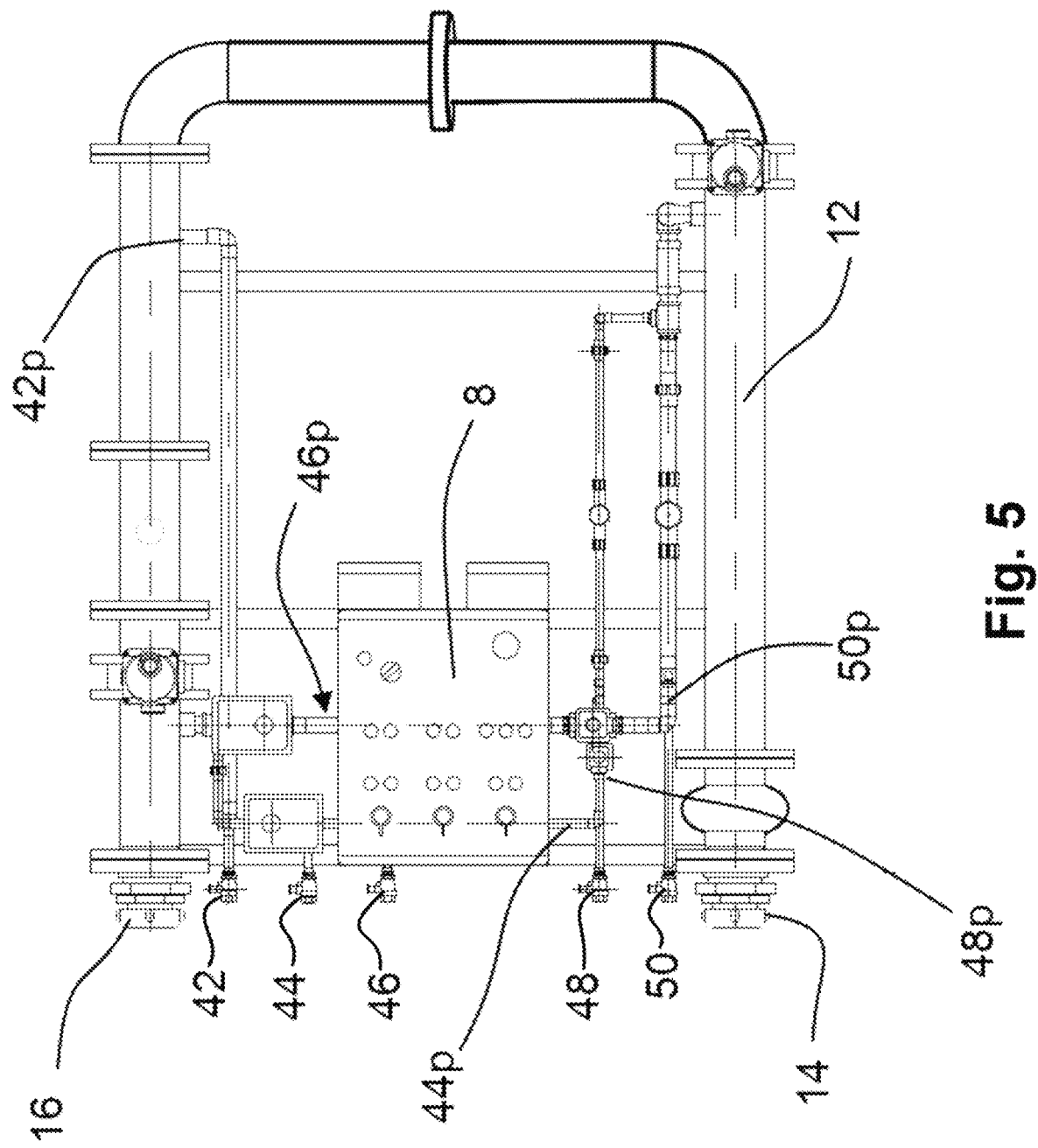
FIG. 5 is a top plan view showing a controller panel.

Referring now more particularly to FIG. 3, and FIG. 5, draining features of the mobile fluid meter tester (10) are considered. Once testing has been completed, mobile fluid meter tester (10) may not be used for a prolonged period of time and during such period of time the environmental temperature surrounding the mobile tester may drop below freezing. Regardless, it is desirable to remove as much fluid from the test system as possible. Thus, for the current embodiment, the mobile fluid meter tester (10) is configured with a draining system. Referring now to FIG. 3, a front view of mobile fluid meter tester (10) is presented, showing a tester input (14) elevated relative to a tester output (16). For the current embodiment, the difference in elevation creates a 4° To 5° incline (15) between the input and the output. Such configuration uses gravity to generate the forces needed to drain the fluid out of the primary flow path (12), second flow path (26), and third flow path (34). In addition, as best seen in FIG. 5, for the current embodiment the test system contains a plurality of drain valves including drain valve (42), drain valve (44), drain valve (46), drain valve (48), drain valve (50) (collectively referred to simply as drain valves). Each drain valve may be connected to the end of a drain path configured to drain a particular segment of pipe between two flow valves. For example, a drain valve (42) is connected to a drain path (42p) that drains the primary flow path (12) between the first primary flow valve (20) and the second primary flow valve (24). Similarly, a drain valve (44) is connected to a drain path (44p) that drains the flow path between the second low flow valve element (40) and the first low flow valve element (38). Similarly, a drain valve (46) may be connected to a drain path (46p) that drains the flow path between a first medium flow valve (30) and a second medium flow valve (32). A drain valve (48) may be connected to a drain path (48p) that drains a flow path between a first low flow valve element (38) and a second low flow valve element (40). A drain valve (50) may be connected to a drain path (50p) that drains a flow path between a first primary flow valve (20) and a first medium flow valve (30).

Valves

Preferably the first primary flow valve (20), the second primary flow valve (24), the first medium flow valve (30), the second medium flow valve (32), the first low flow valve element (38) and the second low flow valve element (40) are each electronically actuated valves electrically associated with a controller (8) shown in FIG. 5. Such allows one to automatically select, via software executed by a controller (8), the correct flow path and associated flow metering device for a particular test.

As depicted for the exemplary embodiments, the drain valves are manual valves as they are less expensive than electronic valves, and they are not used very often. That said, one of ordinary skill in the art will appreciate that it would be easy to replace manual valves with electronic valves such as the flow valves described above.

Controller

The controller (8) may be any general-purpose computing device configured with an operating system and the appropriate test software needed to form a specific purpose controller that provides a user interface and allows a user to perform the desired testing and document the results. The system may further be configured with sensors for detecting any number of environmental or test system parameters where such sensors are electrically associated with the controller and or a remote device via a wired or wireless network. Such environmental parameters include temperature, motion, fluid detector, pressure, fluid flow rate, and elapsed time.

The controller (8) processing device may be further networked to a centralized database. For one embodiment, the mobile fluid meter tester (10) may be configured to measure the accuracy of fluid meters and transfer meter data to a remote data-system. A computing device may be placed in communication with the controller and provides a communication path between a user and the test system and the remote data-system. Test software may be operably associated with the computing device which provides a user interface to allow at least one of (a) a local user and (b) a remote user to communicate with the controller to conduct fluid meter testing and generate meter test data for at least one meter under test. As noted above, the test software may be configured to transfer at least part of the meter data (defined below) to a remote centralized data-system in communication, over a computer network, with a plurality of test bench systems to develop a meter database (referred to herein as an A Posteriori Meter Database) on a plurality of meter types. Preferably, the test systems have been tested and certified to comply with a predefined regulatory standard to provide traceability to standards such as the National Institute of Standards and Technology (NIST). Such certification data may be associated with meter data for the meter under test.

It should be appreciated that the software may be completely installed on the local computing device (a standalone system), or the software may be at least partially stored on a remote computer associated with the computing device through a network such as the Internet. Such a remote computer may be defined by the remote data-system or an independent system. A computing device may be a device such as a smartphone that accesses the software through an application that is at least partially stored on the smartphone. One of ordinary skill in the art will appreciate that there are many such configurations that can be deployed that fall within the scope and spirit of the invention.

Testing Process

As stated previously, fluid meters are generally engineered to be most accurate for an anticipated flow rate. For example, a flow meter that typically measures flow rates of 50 gallons per minute would ideally be very accurate at 50 gallons per minute and may not as accurate and 2 gallons a minute. In any event, it is generally required to test flow meters and a plurality of flow rates. Thus, for the current embodiment of the mobile fluid meter tester (10), there are three tests metering devices that are particularly accurate for a particular flow rate, which will be called high flow rate, medium flow rate, and low flow rate, for the purposes of this document. For the mobile tester (10), the tester metering devices (22, 28, 36) meet a predefined accuracy rate for their particular flow rate. The flow volume indicated by such tester metering devices will be considered the "actual flow rate" to which the meter under test is to be compared to determine whether or not the meter under test meets predefined criteria for accuracy.

Once the MUT has been associated with a mobile tester (10) as described above, the testing can begin. The first test may be a high flow test where the first primary flow valve (20) and the second primary flow valve (24) are open, and the remaining flow valves are closed thereby creating a flow path from mobile tester input (14) through high flow metering device (22) and out mobile tester output (16). The test is run for the predefined flow rate and duration, and then the fluid flow is cut off by actuating the first primary flow valve (20), thereby closing such a valve. The volume of flow indicated by the high flow metering device (22) may be documented and compared to the flow rate indicated by the MUT, which may also documented. If the two values are within an acceptable predefined range, the MUT will be deemed to have passed the high flow test.

Next, the medium flow test is conducted. For this test, the second primary flow valve (24) is actuated to turn it off and the first medium flow valve (30) and the second medium flow valve (32) are actuated to turn them on (open them) to allow fluid to flow from the mobile tester input (14), through a section of the primary flow path (12), and into the second flow path (26), through the medium flow metering device (28), and to the mobile meter tester output (16). As before, the test is run for the predefined flow rate and duration and then the flow is cut off by actuating the first medium flow valve (30) thereby closing such a valve. The volume of flow indicated by the medium flow metering device (28) is documented and compared to the flow rate indicated by the MUT, which is also documented. If the two values are within an acceptable predefined range, the MUT will be deemed to have passed the medium flow test.

Next, the low flow test is conducted. For this test, the second medium flow valve (24) is actuated to turn it off and the first low flow valve element (38) and the second low flow valve (38) are actuated to turn them on (open them) to allow fluid to flow from the mobile tester input (14), through a section of the primary flow path (12), and into the second flow path (26), and to the third flow path (34) and to and through the low flow metering device (36), and to the mobile meter tester output (16). As before, the test is run for the predefined flow rate and duration and then the flow is cut off actuating the first low flow valve (38) and second low flow valve (40) thereby closing such valves. The volume of flow indicated by the low flow metering device (36) is documented and compared to the flow rate indicated by the MUT, which is also documented. If the two values are within an acceptable predefined range, the MUT will be deemed to have passed the medium flow test.

Once testing is completed, the MUT and fluid source are disconnected from the mobile tester (14), and preferably all the electronic valves and all the drain valves are opened to train the system of all or substantially all fluids remaining after the testing.

The controller (8) may further be configured to monitor the various environmental sensors and generate alerts or warnings during testing or while mobile tester (14) is in storage. For such embodiment, a controller (8) may be connected to a power source and may be in wireless or wired communication with a local and/or a wide area network. For example, if controller (8) detects that there is fluid in the system and the temperature is reaching a predefined level (such as freezing), a warning may be issued to a predefined device using any suitable criteria such as phone numbers (call or text message), e-mail addresses, or some proprietary communication means. If there is no response within a predefined period of time, the controller (8) may be configured to take automatic action such as draining the system when the temperatures approaching freezing and water is detected in the system.

As for the flow metering devices (22, 28, 36), such devices may be any suitable devices a plurality of which are well known in the art. One suitable type of meter in devices includes Mac flow meters electrically associated with a controller (8), allowing almost complete automation of the testing process.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A fluid meter test system configured to fit in the bed of a truck and for testing the accuracy of fluid meters, said fluid meter test system comprising: a primary flow channel generally defining a U-shaped configuration comprising: a first primary flow section defining a linear section having a first end and an opposing second end wherein a system input is defined at the first end; a second primary flow section defining a linear section having a first end and an opposing second end wherein the first end of said second primary flow section is in fluid communication with the second end of said first primary flow section and wherein said second primary flow section extends perpendicularly away from said first primary flow section; a third primary flow section defining a linear section having a first end and an opposing second end wherein the first end of said third primary flow section is in fluid communication with the second end of said second primary flow section and wherein said third primary flow section defines a system output at the second end of said third primary flow section and wherein said third primary flow section extends perpendicularly away from said second primary flow section and parallel to said first primary flow section to define a U-shaped flow channel that fits in the bed of a truck; wherein the system input is configured for being placed in fluid communication with an output of an installed flow meter and the system output is configured for being placed in fluid communication with a test fluid receiver so that a fluid that flows through the installed flow meter flows into the system input and through the system output without removing the installed flow meter from its installation point; a primary flow meter disposed along the third primary flow section; a primary drain line comprising a primary drain valve where said primary drain line is in fluid communication with said primary flow channel and configured to drain fluid from the primary flow channel when the primary drain valve is open; wherein the system input is elevated relative to the system output; a primary valve disposed along said primary flow channel downstream of the system input and upstream from said primary flow meter; a second flow channel defining a first end in fluid communication with said primary flow channel downstream of the system input and upstream of said primary valve and further defining a second end in fluid communication with said primary flow channel downstream of said primary flow meter and upstream of said system output; a second flow meter disposed along said second flow channel downstream of the first end of said second flow channel; and a secondary valve disposed along said second flow channel upstream of the system output and downstream of said second flow meter.

2. A fluid meter test system as in claim 1, wherein a difference in elevation between the system input and the system output defines an incline of between about 4 degrees and 5 degrees.

3. A fluid meter test system as in claim 1, wherein a portion of said second flow channel comprising said second flow meter is coplanar with said third primary flow section.

4. A fluid meter test system as in claim 1, further comprising secondary drain line comprising a secondary drain valve where said secondary drain line is in fluid communication with said second flow channel downstream from said second flow meter and wherein said secondary drain line is configured to drain fluid from the second flow channel when said secondary drain valve is open.

5. A fluid meter test system as in claim 4, further comprising a third flow channel defining a first end in fluid communication with said second flow channel upstream of said second flow meter and further defining a second end in fluid communication with said second flow channel downstream of said secondary valve; a third flow meter disposed along said third flow channel downstream of the first end of said third flow channel and upstream of the second end of said third flow channel; a trinary valve disposed along said third flow channel downstream of said third flow meter and upstream of the second end of said third flow channel.

6. A fluid meter test system as in claim 5, wherein a portion of said third flow channel comprising said third flow meter is coplanar with said third primary flow section.

7. A fluid meter test system as in claim 5, wherein a portion of said third flow channel comprising said third flow meter is coplanar with a portion of said second flow channel comprising the second flow meter.

8. A fluid meter test system as in claim 5, further comprising trinary drain line comprising a trinary drain valve where said trinary drain line is in fluid communication with said third flow channel downstream from said third flow meter and wherein said trinary drain line is configured to drain fluid from the third flow channel when said trinary drain valve is open.

9. A fluid meter test system as in claim 8, wherein said primary flow channel, said second flow channel and said third flow channel comprises pipe and wherein a diameter of the primary flow channel pipe is larger than a diameter of the second flow channel pipe and wherein the diameter of the second flow channel pipe is larger than a diameter of the third flow channel pipe.

10. A fluid meter test system as in claim 9, wherein said primary flow meter is more accurate at higher flows rates compared to said second flow meter, which is more accurate at higher flow rates than said third flow meter.

11. A fluid meter test system as in claim 10, wherein said primary valve, said secondary valve and said trinary valve are electronic valves electrically associated with a controller wherein said controller is configured to automatically open and close at least one of said primary valve, said secondary valve, or said trinary valve.

12. A fluid meter test system as in claim 11, wherein said primary drain valve, said secondary drain valve, and said trinary drain valve are electronic valves electrically associated with the controller.

13. A fluid meter test system configured to fit in the bed of a truck and for testing the accuracy of fluid meters, said fluid meter test system comprising: a primary flow channel generally defining a U-shaped configuration comprising: a first primary flow section defining a linear section having a first end and an opposing second end wherein a system input is defined at the first end; a second primary flow section defining a linear section having a first end and an opposing second end wherein the first end of said second primary flow section is in fluid communication with the second end of said first primary flow section and wherein said second primary flow section extends perpendicularly away from said first primary flow section; a third primary flow section defining a linear section having a first end and an opposing second end wherein the first end of said third primary flow section is in fluid communication with the second end of said second primary flow section and wherein said third primary flow section defines a system output at the second end of said third primary flow section and wherein said third primary flow section extends perpendicularly away from said second primary flow section and parallel to said first primary flow section to define a U-shaped flow channel that fits in the bed of a truck; wherein the system input is configured for being placed in fluid communication with an output of a flow meter to be tested, and the system output is configured for being placed in fluid communication with a test fluid receiver so that a fluid that flows through the flow meter flows into the system input and through the system output; a primary flow meter disposed along the third primary flow section; a primary drain line comprising a primary drain valve where said primary drain line is in fluid communication with said primary flow channel and configured to drain fluid from the primary flow channel when the primary drain valve is open; wherein the system input is elevated relative to the system output; a primary valve disposed along said primary flow channel downstream of the system input and upstream from said primary flow meter; a second flow channel defining a first end in fluid communication with said primary flow channel downstream of the system input and upstream of said primary valve and further defining a second end in fluid communication with said primary flow channel downstream of said primary meter and upstream of said system output; a second flow meter disposed along said second flow channel downstream of the first end of said second flow channel; and a secondary valve disposed along said second flow channel upstream of the system output and downstream of said second flow meter.

14. A fluid meter test system as in claim 13, wherein a difference in elevation between the system input and the system output defines an incline of between about 4 degrees and 5 degrees.

15. A fluid meter test system as in claim 13, wherein a difference in elevation between the system input and the system output defines an incline of between about 4 degrees and 5 degrees.

16. A fluid meter test system as in claim 13, further comprising secondary drain line comprising a secondary drain valve where said secondary drain line is in fluid communication with said second channel downstream from said second flow meter and wherein said secondary drain line is configured to drain fluid from the second flow channel when said secondary drain valve is open.

17. A fluid meter test system as in claim 13, further comprising a third flow channel defining a first end in fluid communication with said second flow channel upstream of said second flow meter and further defining a second end in fluid communication with said second flow channel downstream of said secondary valve; a third flow meter disposed along said third flow channel downstream of the first end of said third flow channel and upstream of the second end of said third flow channel; a trinary valve disposed along said third flow channel downstream of said third flow meter and upstream of the second end of said third flow channel.

18. A fluid meter test system as in claim 17, wherein a portion of said third flow channel comprising said third flow meter is coplanar with said third primary flow section.

19. A fluid meter test system as in claim 17, wherein a portion of said third flow channel comprising said third flow meter is coplanar with a portion of the second flow channel comprising the second flow meter.

20. A fluid meter test system as in claim 17, further comprising trinary drain line comprising a trinary drain valve where said trinary drain line is in fluid communication with said third flow channel downstream from said third flow meter and wherein said trinary drain line is configured to drain fluid from the third flow channel when said trinary drain valve is open.

* * * * *